(12) United States Patent
Evertsson et al.

(10) Patent No.: US 11,153,843 B2
(45) Date of Patent: Oct. 19, 2021

(54) MECHANISMS FOR LOCATING WIRELESS DEVICES

(71) Applicant: Telefonaktiebolaget LM Ericsson (publ), Stockholm (SE)

(72) Inventors: Rickard Evertsson, Lund (SE); Martin Klitte, Malmö (SE); Staffan Månsson, Åkarp (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 16/481,652

(22) PCT Filed: Feb. 16, 2017

(86) PCT No.: PCT/EP2017/053489
§ 371 (c)(1),
(2) Date: Jul. 29, 2019

(87) PCT Pub. No.: WO2018/149496
PCT Pub. Date: Aug. 23, 2018

(65) Prior Publication Data
US 2020/0008170 A1    Jan. 2, 2020

(51) Int. Cl.
*H04W 64/00* (2009.01)
*G01S 5/02* (2010.01)
*H04W 60/04* (2009.01)

(52) U.S. Cl.
CPC ......... *H04W 64/003* (2013.01); *G01S 5/0289* (2013.01); *H04W 60/04* (2013.01)

(58) Field of Classification Search
CPC ..... H04W 64/003; H04W 4/90; H04W 60/04; H04W 64/00; G01S 5/0289; G01S 5/02
See application file for complete search history.

(56) References Cited

U.S. PATENT DOCUMENTS

| | | | |
|---|---|---|---|
| 2006/0205445 | A1 | 9/2006 | Sakaniwa et al. |
| 2010/0151814 | A1 | 6/2010 | Bragg |
| 2011/0165892 | A1* | 7/2011 | Ristich ................. H04W 64/00 455/456.2 |
| 2013/0042011 | A1 | 2/2013 | Sugizaki et al. |
| 2015/0111523 | A1 | 4/2015 | South |
| 2015/0365789 | A1* | 12/2015 | Salot ...................... H04W 4/02 455/456.1 |

(Continued)

FOREIGN PATENT DOCUMENTS

| | | |
|---|---|---|
| EP | 1461637 A2 | 9/2004 |
| WO | 9955115 A1 | 10/1999 |

(Continued)

*Primary Examiner* — Christopher M Brandt
(74) *Attorney, Agent, or Firm* — Sage Patent Group (57) ABSTRACT

There is provided mechanisms for locating wireless devices. A method is performed by a network operator node of cells. The method comprises obtaining an indication to locate wireless devices in a geographical area from a surveillance center node (s102). The method comprises initiating a change of logical group area identity of those of its cells that at least partly overlap with the geographical area (s104), thereby initiating location reporting from those wireless devices located in the geographical area that are in idle mode. The method comprises, in response thereto, receiving location indicating information from the wireless devices in the geographical area (s106).

16 Claims, 5 Drawing Sheets

(56) References Cited

U.S. PATENT DOCUMENTS

| | | | | |
|---|---|---|---|---|
| 2016/0007316 A1* | 1/2016 | Vaidya | ............... | H04W 64/003 370/312 |
| 2016/0150495 A1* | 5/2016 | Machida | ............... | H04W 60/04 455/435.3 |
| 2016/0212607 A1 | 7/2016 | Trichias et al. | | |
| 2018/0184236 A1* | 6/2018 | Faraone | ............... | G09B 29/007 |
| 2018/0220479 A1* | 8/2018 | Shu | ............... | H04W 8/08 |
| 2018/0262903 A1* | 9/2018 | Ryan | ............... | H04W 4/90 |

FOREIGN PATENT DOCUMENTS

| | | |
|---|---|---|
| WO | 03060544 A2 | 7/2003 |
| WO | 2015147670 A1 | 10/2015 |
| WO | 2016130053 A1 | 8/2016 |

\* cited by examiner

MECHANISMS FOR LOCATING WIRELESS DEVICES

TECHNICAL FIELD

Embodiments presented herein relate to methods, a network operator node, a surveillance center node, computer programs, and a computer program product for locating wireless devices.

BACKGROUND

One parameter in providing good performance and capacity for a given communications protocol in a communications system is the ability for network operators to locate wireless devices served in the communications system.

One way to locate wireless devices is to initiate Assisted GPS (abbreviated generally as A-GPS or aGPS, where GPS is short for Global Positioning System) in a wireless device from the network-side of the communication system, such as from a radio access network node. The use of A-GPS requires prior communication to exist between the wireless device and the radio access network node. In general terms, standalone/self-ruling GPS devices depend solely on information from satellites. A-GPS augments that by using data from the radio access network node to enhance quality and precision, for example when in poor satellite signal conditions.

Further, there is no way for the network-side to know the exact position, or even the position on cell level, of wireless devices that are registered in a tracking area (TA), or similar, but that operate in idle mode. The exact positions of the wireless devices are unknown due to the comparatively large size of the TAs. Only wireless devices that operate in connected mode (by having active calls or data bearers set up) can in some way have their position narrowed down to a reasonable accuracy, such as at cell level or even more precise than that.

Hence, there is still a need for improved mechanisms for locating wireless devices, particularly those wireless devices that are in idle mode.

SUMMARY

An object of embodiments herein is to provide efficient localization of wireless devices.

According to a first aspect there is presented a method for locating wireless devices. The method is performed by a network operator node of cells. The method comprises obtaining an indication to locate wireless devices in a geographical area from a surveillance center node. The method comprises initiating a change of logical group area identity of those of its cells that at least partly overlap with the geographical area, thereby initiating location reporting from those wireless devices located in the geographical area that are in idle mode. The method comprises, in response thereto, receiving location indicating information from the wireless devices in the geographical area.

According to a second aspect there is presented a network operator node of cells for locating wireless devices. The network operator node comprises processing circuitry. The processing circuitry is configured to cause the network operator node to obtain an indication to locate wireless devices in a geographical area from a surveillance center node. The processing circuitry is configured to cause the network operator node to initiate a change of logical group area identity of those of its cells that at least partly overlap with the geographical area, thereby initiating location reporting from those wireless devices located in the geographical area that are in idle mode. The processing circuitry is configured to cause the network operator node to, in response thereto, receive location indicating information from the wireless devices in the geographical area.

According to a third aspect there is presented a network operator node of cells for locating wireless devices. The network operator node comprises processing circuitry and a storage medium. The storage medium stores instructions that, when executed by the processing circuitry, cause the network operator node to perform operations, or steps. The operations, or steps, cause the network operator node to obtain an indication to locate wireless devices in a geographical area from a surveillance center node. The operations, or steps, cause the network operator node to initiate a change of logical group area identity of those of its cells that at least partly overlap with the geographical area, thereby initiating location reporting from those wireless devices located in the geographical area that are in idle mode. The operations, or steps, cause the network operator node to, in response thereto, receive location indicating information from the wireless devices in the geographical area.

According to a fourth aspect there is presented a network operator node of cells for locating wireless devices. The network operator node comprises an obtain module configured to obtain an indication to locate wireless devices in a geographical area from a surveillance center node. The network operator node comprises an initiate module configured to initiate a change of logical group area identity of those of its cells that at least partly overlap with the geographical area, thereby initiating location reporting from those wireless devices located in the geographical area that are in idle mode. The network operator node comprises a receive module configured to, in response thereto, receive location indicating information from the wireless devices in the geographical area.

According to a fifth aspect there is presented a computer program for locating wireless devices, the computer program comprises computer program code which, when run on processing circuitry of a network operator node of cells, causes the network operator node to perform a method according to the first aspect.

According to a sixth aspect there is presented a method for locating wireless devices. The method is performed by a surveillance center node. The method comprises obtaining a request for locating wireless devices in a geographical area. The method comprises providing an indication to locate the wireless devices in the geographical area to a network operator node having cells in the geographical area. The method comprises, in response thereto, receiving location indicating information of the wireless devices from the network operator node.

According to a seventh aspect there is presented a surveillance center node for locating wireless devices. The surveillance center node comprises processing circuitry. The processing circuitry is configured to cause the surveillance center node to obtain a request for locating wireless devices in a geographical area. The processing circuitry is configured to cause the surveillance center node to provide an indication to locate the wireless devices in the geographical area to a network operator node having cells in the geographical area. The processing circuitry is configured to cause the surveillance center node to, in response thereto, receive location indicating information of the wireless devices from the network operator node.

According to an eighth aspect there is presented a surveillance center node for locating wireless devices. The surveillance center node comprises processing circuitry and a storage medium. The storage medium stores instructions that, when executed by the processing circuitry, cause the surveillance center node to perform operations, or steps. The operations, or steps, cause the surveillance center node to obtain a request for locating wireless devices in a geographical area. The operations, or steps, cause the surveillance center node to provide an indication to locate the wireless devices in the geographical area to a network operator node having cells in the geographical area. The operations, or steps, cause the surveillance center node to, in response thereto, receive location indicating information of the wireless devices from the network operator node.

According to a ninth aspect there is presented a surveillance center node for locating wireless devices. The surveillance center node comprises an obtain module configured to obtain a request for locating wireless devices in a geographical area. The surveillance center node comprises a provide module configured to provide an indication to locate the wireless devices in the geographical area to a network operator node having cells in the geographical area. The surveillance center node comprises a receive module configured to, in response thereto, receive location indicating information of the wireless devices from the network operator node.

According to a tenth aspect there is presented a computer program for locating wireless devices, the computer program comprising computer program code which, when run on processing circuitry of a surveillance center node, causes the surveillance center node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network operator nodes, these surveillance center nodes, and these computer programs provide efficient localization of wireless devices, especially of wireless devices in idle mode.

Advantageously these methods, these network operator nodes, these surveillance center nodes, and these computer programs enable real-time tracking of wireless devices in an area of interest.

Advantageously these methods, these network operator nodes, these surveillance center nodes, and these computer programs provide assist in search and rescue operations as well as tracking operations by enabling authorities to localize victims, or other persons to be tracked, in scenarios where the victim, or person to be tracked, carries a wireless device but him/herself is unable, or unwilling, to come forward to be localized.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
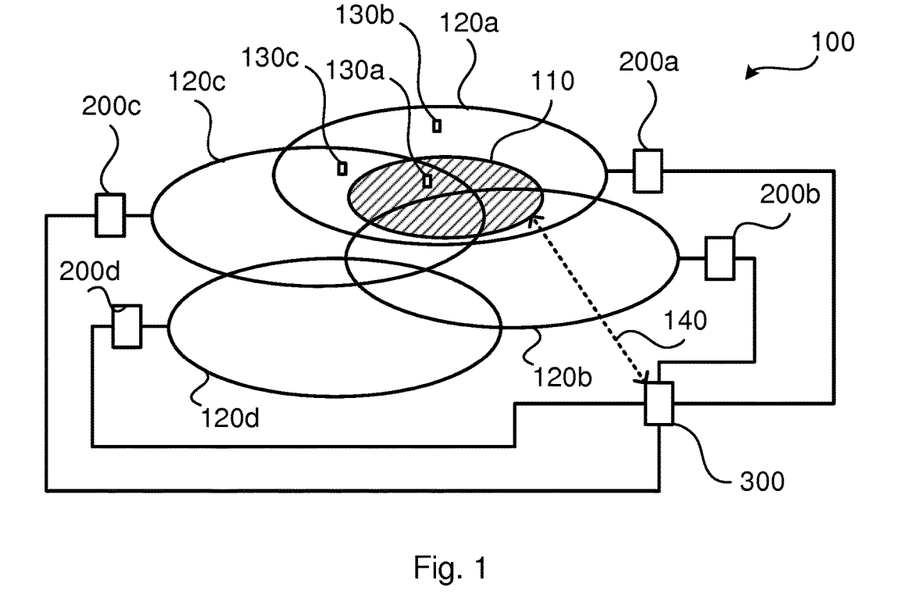
FIG. 1 is a schematic diagram illustrating a communication network according to embodiments.

FIG. 1 is a schematic diagram illustrating a communications network 100 where embodiments presented herein can be applied. The communications network 100 comprises (collections of) cells 120a, 120b, 120c, 120d in which network access is provided by network operators, as represented by network operator nodes 200a, 200b, 200c, 200d. Network access is provided to wireless devices 130a, 130b, 130c having a network subscription to one of the network operators and being located in a cell 120a, 120b, 120c, 120d served by that network operator. Each wireless device 130a, 130b, 130c could be any of a portable wireless device, mobile station, mobile phone, handset, wireless local loop phone, user equipment (UE), smartphone, laptop computer, tablet computer, wireless modem, wireless sensor device, vehicle (such as a drone or a car), etc.

The communications network 100 further comprises a surveillance center node 300. The surveillance center node 300 is operatively connected to the network operator nodes 200a, 200b, 200c, good. The surveillance center node 300 is further configured to receive signalling (as schematically illustrated at reference numeral 140) identifying a geographical area 110 in which wireless devices are to be localized. In this respect, the signalling identifying the geographical area 110 does not necessarily originate from one of the network operator nodes 200a, 200b, 200c, good, but may originate from an alarm system (e.g., a bank security alarm system, a home security alarm system, a public alarm system, a private security alarm system, a fire alarm system, an emergency alarm system, etc.) or from an authority (e.g., police service, fire brigade service, or ambulance service). The signalling 140 may be received through a cellular network or through other connections. Further functionality of the surveillance center node 300 will be provided below.

Figure 2:
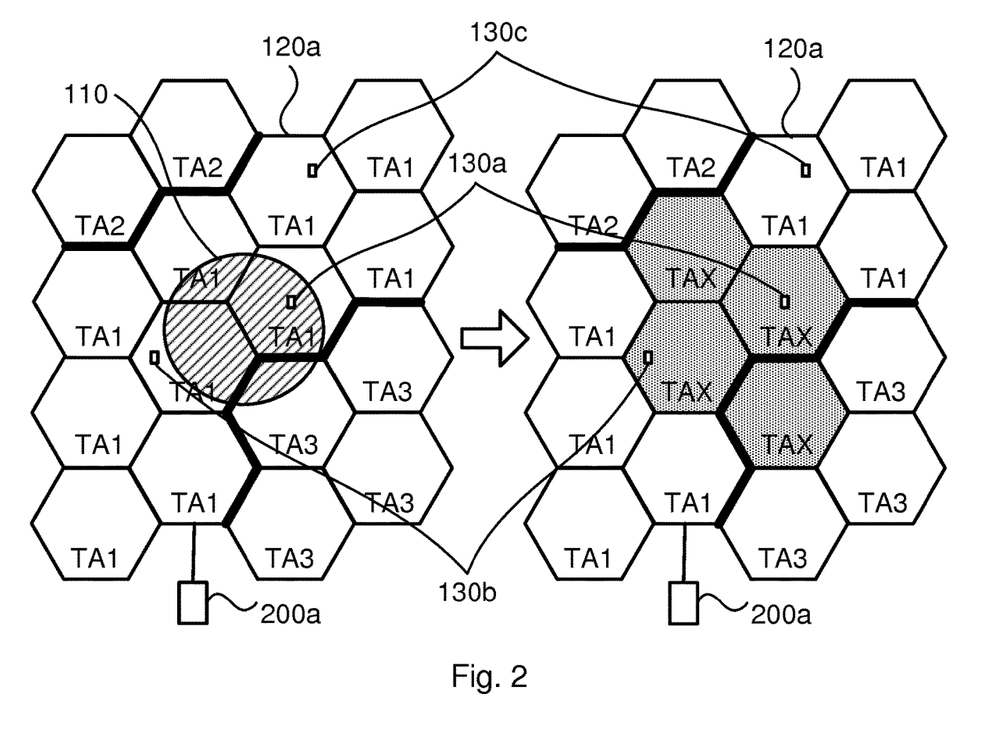
FIG. 2 is a schematic illustration of logical group areas in part of the communication network of FIG. 1 according to embodiments.

FIG. 2 is a schematic diagram illustrating part of the communications network 100 of FIG. 1. In particular, FIG. 2 schematically illustrates logical group areas in part of the communication network of FIG. 1 according to embodiments. Examples of logical group areas include, but are not limited to, tracking areas as used in fourth generation (4G) telecommunications systems, location areas as used in third generation (3G) telecommunications systems, and service areas as used in fifth generation (5G) telecommunications systems.

The left-hand side of FIG. 2 illustrates logical group areas of individual cells of the cells 120a of the network operator represented by network operator node 200a. Each logical group area has an identity. In the illustrative example of the left-hand side of FIG. 2 there are three such identities; $TA_1$, $TA_2$, $TA_3$.

As will be further disclosed below, a change of logical group area identity of those cells that at least partly overlap with the geographical area 110 will be performed. As schematically illustrated, the geographical region 110 partly overlaps with three of the cells of the logical group area denoted $TA_1$ and one of the cells of the logical group area denoted $TA_3$.

The right-hand side of FIG. 2 illustrates the same part of the communications network 100 as the left-hand side but in a network state where the above-mentioned three cells of the logical group area with identity $TA_1$ and one cells of the logical group area with identity $TA_3$ have been updated to have identity TAX. TAX is thus the new logical group area identity of these cells. The symbolic arrow indicates transition from the network state on left-hand side to the network state on right-hand side. In this respect, the herein disclosed embodiments are not limited to have one and the same logical group area identity (TAX in the present example) in all cells but there could be at least two new logical group area identities (such as TAX, TAY, TAZ, etc.), or even as many new logical group area identities as the number of cells for which the logical group area identity is changed.

For illustrative and non-limiting purposes, wireless device 130a is located inside the geographical area 110, wireless device 130b is located outside the geographical area no but inside a cell which partly overlaps with the geographical area 110, and wireless device 130c is located outside the geographical area no in a cell that does not at least partly overlap with the geographical area 110.

The embodiments disclosed herein relate to mechanisms for locating wireless devices 130a, 130b. In order to obtain such mechanisms there is provided a network operator node 200a, a method performed by the network operator node 200a, a computer program product comprising code, for example in the form of a computer program, that when run on processing circuitry of the network operator node 200a, causes the network operator node 200a to perform the method. In order to obtain such mechanisms there is further provided a surveillance center node 300, a method performed by the surveillance center node 300, and a computer program product comprising code, for example in the form of a computer program, that when run on processing circuitry of the surveillance center node 300, causes the surveillance center node 300 to perform the method.

Figure 3:
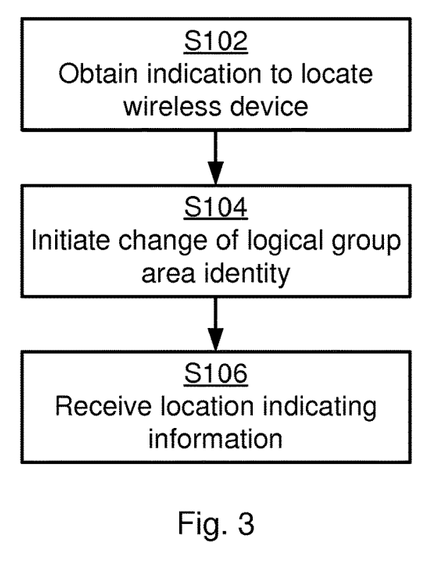
FIGS. 3, 4, 5, and 6 are flowcharts of methods according to embodiments.
Figure 4:
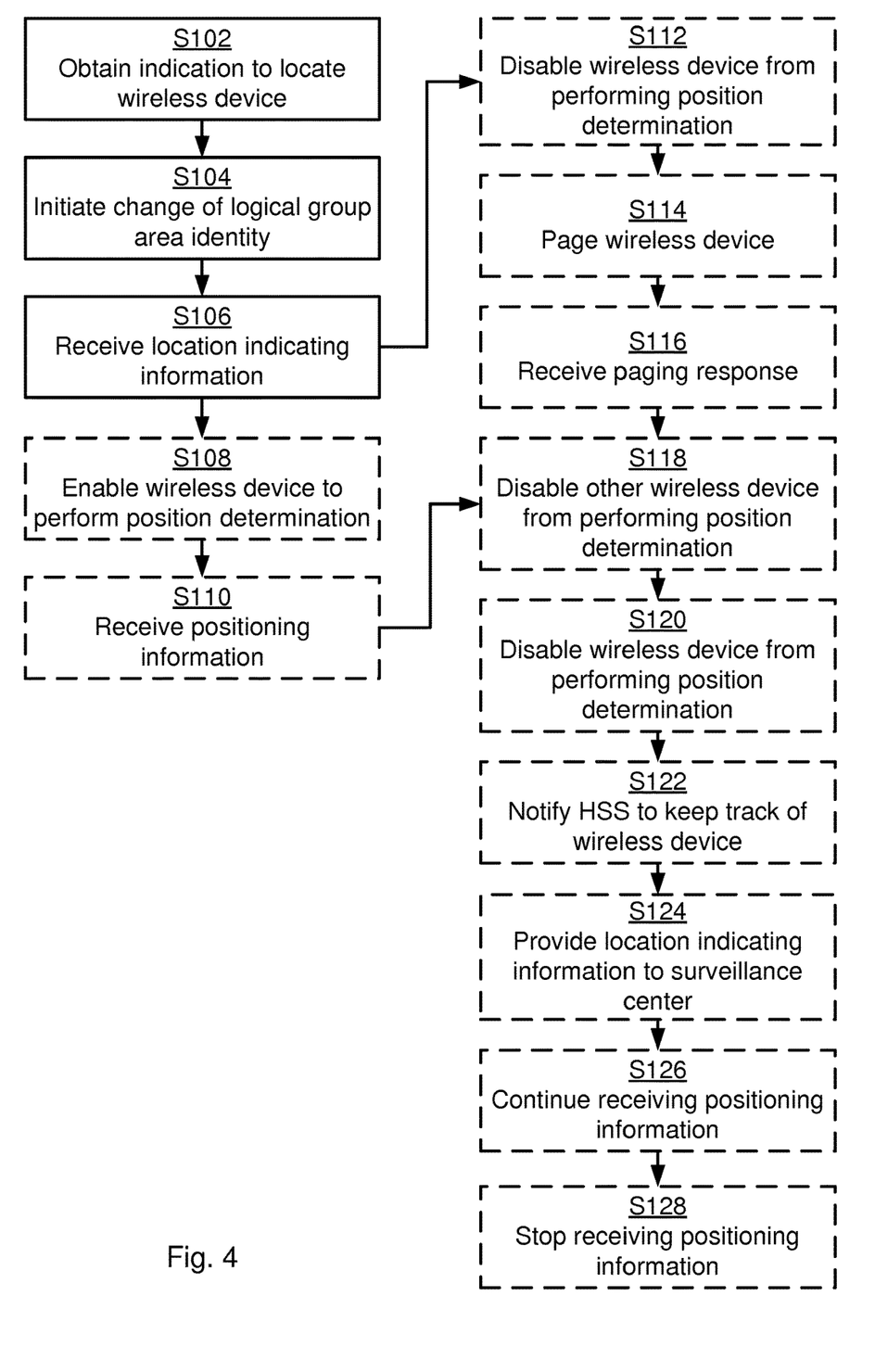
Figure 5:
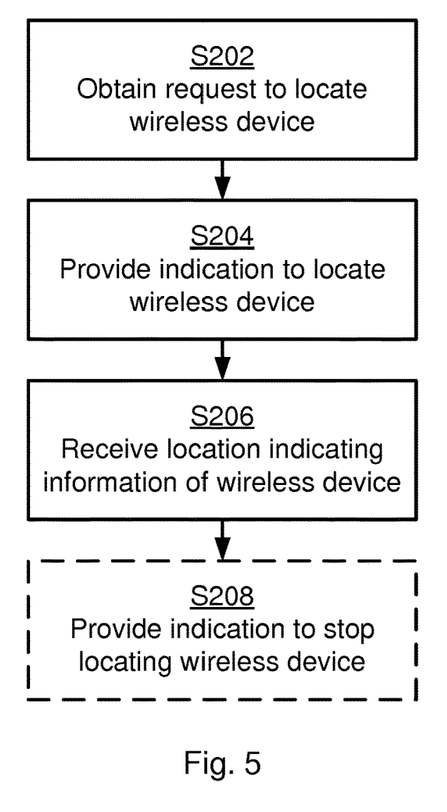

FIGS. 3 and 4 are flowcharts illustrating embodiments of methods for locating wireless devices 130a, 130b as performed by the network operator node 200a. FIG. 5 is a flowchart illustrating embodiments of methods for locating wireless devices 130a, 130b as performed by the surveillance center node 300. The methods are advantageously provided as computer programs 1120a, 1120b.

Reference is now made to FIG. 3 illustrating a method for locating wireless devices 130a, 130b as performed by the network operator node 200a of cells 120a according to an embodiment.

S102: The network operator node 200a obtains an indication to locate wireless devices in a geographical area 110 from the surveillance center node 300.

The network operator represented by the network operator node good does not have any cells that at least partly overlap with the geographical area 110 and hence the network operator node good does not obtain any indication in step S102.

The network operator node 200a thereafter locates wireless devices 130a, 130b by updating the logical group area identity of some particular ones of its cells 120a. Examples of group area identities have been provided above and will be repeated below for completeness. Particularly, the network operator node 200a is configured to perform steps S104 and S106:

S104: The network operator node 200a initiates a change of logical group area identity of those of its cells 120a that at least partly overlap with the geographical area 110. The network operator node 200a thereby initiates location reporting from (at least) those wireless devices 130a, 130b located in the geographical area 110 that are in idle mode.

S106: The network operator node 200a, in response to having initiated the change of logical group area identity in step S104, receives location indicating information from the wireless devices 130a, 130b in the geographical area 110. Examples of location indicating information will be provided below.

The location reporting thus involves the wireless devices 130a, 130b to provide location indicating information to the network operator node 200a. That is, initiating location reporting by the network operator node 200a triggers the wireless devices 130a, 130b to start providing the location indicating information to the network operator node 200a.

This method enables determining of which wireless devices 130a, 130b are located in the geographical area 110, especially, but not limited to, those wireless devices 130a, 130b that are in idle mode. This method thereby enables real-time tracking of wireless devices 130a, 130b in an area of interest.

Embodiments relating to further details of locating wireless devices 130a, 130b as performed by the network operator node 200a will now be disclosed.

There could be different examples of indications obtained in step S102 to locate wireless devices 130a, 130b. In some aspects the indication is given in terms of specifying a geographical area or is given in terms of an explicit definition, or identification, of cells 120*a*. Particularly, according to an embodiment the indication to locate the wireless devices 130*a*, 130*b* defines the geographical area 110 or defines those cells 120*a* for which the logical group area is to be changed.

There could be different examples of location indicating information received from the wireless devices 130*a*, 130*b* in step S106. In some aspects the location indicating information is a Tracking Area update.

As mentioned above, there could be different examples of logical group areas. In some aspects the logical group area is a Tracking Area (TA), a Location Area (LA), or a Service Area (SA). Thus the location indicating information could be a TA update, an LA update, or an SA update.

Reference is now made to FIG. 4 illustrating methods for locating wireless devices 130*a*, 130*b* as performed by the network operator node 200*a* according to further embodiments. It is assumed that steps S102, S104, S106 are performed as described above with reference to FIG. 3 and a thus repeated description thereof is therefore omitted.

There may be different ways for the network operator node 200*a* to act once having received the location indicating information from the wireless devices 130*a*, 130*b*. Different embodiments relating thereto will now be described in turn.

In some aspects the network operator node 200*a* enables the use of a positioning feature (e.g., enhanced Cell ID, Observed Time Difference Of Arrival (OTDOA), A-GPS, Global Navigation Satellite System (GLONASS), Uplink-Time Difference of Arrival (U-TDOA), or the like) for those wireless devices 130*a*, 130*b* located in the cells 120*a* for which the logical group area identity has been updated. Particularly, according to an embodiment the network operator node 200*a* is configured to perform steps S108 and S110:

S108: The network operator node 200*a* enables at least some of the wireless devices 130*a*, 130*b* located in the geographical area 110 to perform position determination.

S110: The network operator node 200*a*, in response thereto, receives, from these at least some of the wireless devices 130*a*, 130*b*, positioning information resulting from the position determination.

In this respect, the positioning information gives more precise information about the actual location of the wireless devices 130*a*, 130*b* than the location indicating information of the wireless devices 130*a*, 130*b* (which only may indicate the logical group area to which the wireless devices 130*a*, 130*b* belong).

The enablement of the position determination and the sending of location indicating information and positioning information from the wireless devices is preferably achieved without any notification to the users of the wireless devices. Thus, possible criminal users will not be aware that they are tracked.

In some aspects a reduction of network traffic can be achieved by requesting the wireless devices 130*a*, 130*b* to disable use of positioning features. Hence, according to an embodiment the network operator node 200*a* is configured to perform step S112:

S112: The network operator node 200*a* disables at least some of the wireless devices 130*a*, 130*b* previously enabled in step S108 from performing position determination.

The network operator node 200*a* could instead track these wireless devices 130*a*, 13013 by periodically paging the wireless devices 130*a*, 130*b*.

Hence, according to an embodiment the network operator node 200*a* is configured to perform step S114:

S114: The network operator node 200*a* pages at least some of the wireless devices 130*a*, 130*b* previously enabled in step S108.

The thus paged wireless devices 130*a*, 130*b* are assumed to respond with a paging response. Hence, according to the present embodiment the network operator node 200*a* is configured to perform step S116

S116: The network operator node 200*a* receives, from these at least some of the wireless devices 130*a*, 130*b*, paging responses, where the paging responses define positioning information of these at least some of the wireless devices 130*a*, 130*b*.

This enables the network operator to track in which cell a paged wireless device 130*a*, 130*b* is located. If any wireless device 130*a*, 130*b*, 130*c* is tracked by being paged, the surveillance center node 300 could request the wireless device 130*a*, 130*b*, 130*c* to start reporting location using positioning mechanisms (and hence having the use of a positioning mechanism enabled) when needed.

In some aspects the network operator node 200*a* disables some wireless devices 130*c* from performing position determination, for example in order to reduce network traffic. For example, wireless devices 130*c* in those cells that neighbour the cells that at least partly overlap with the geographical area could be instructed to disable their positioning determination. Hence, according to an embodiment the network operator node 200*a* is configured to perform step S118:

S118: The network operator node 200*a* disables wireless devices 130*c* located in cells 120*a* outside the geographical area 110 from performing position determination.

For example, wireless devices 130*b* located outside the radius of interest but inside a cell 120*a* that at least partly overlaps with the geographical area 110 could be instructed to disable their positioning determination. Hence, according to an embodiment the network operator node 200*a* is configured to perform step S120:

S120: The network operator node 200*a* disables wireless devices 130*b* located outside the geographical area 110 but served by a cell 120*a* that at least partly overlaps with the geographical area 110 from performing position determination.

In some aspects the network operator node 200*a* informs the Home Subscriber Server (HSS), or the like, of those wireless devices 130*a*, 130*b* that are tracked for each HSS to know (e.g. by means of subscriber information or lack thereof) which wireless devices 130*a*, 130*b* that are tracked. Hence, according to an embodiment the network operator node 200*a* is configured to perform step S122:

S122: The network operator node 200*a* notifies a HSS of the network operator node 200*a* to keep track of those wireless devices 130*a*, 130*b* from which location indicating information and/or positioning information is obtained.

In some aspects the location information and/or the positioning information is passed on to the surveillance center node 300. Hence, according to an embodiment the network operator node 200*a* is configured to perform step S124:

S124: The network operator node 200*a* provides the location indicating information and/or the positioning information of the wireless devices 130*a*, 130*b* to the surveillance center node 300.

In some aspects the network operator node 200*a* continues receiving positioning information until requested not to do so anymore by the surveillance center node 300, see step S208 below. Hence, according to an embodiment the network operator node 200*a* is configured to perform steps S126 and S128:

S126: The network operator node 200a continues receiving positioning information from the wireless devices 130a, 130b until an indication to stop locating the wireless devices 130a, 130b is obtained from the surveillance center node 300.

S128: The network operator node 200a stops receiving positioning information from the wireless devices 130a, 130b when the indication to stop locating the wireless devices 130a, 130b is obtained.

In some aspects the indication indicates for which wireless devices 130a, 130b the provision of positioning information is to be stopped. In other aspects the indication is valid only for wireless devices 130a, 130b inside, or outside, the geographical area 110. In yet other aspects the indication is valid for all wireless devices 130a, 130b for which location indicating information and/or the positioning is provided to the surveillance center node 300 as in step S124.

For cells 120a, 120b, 120c with a comparatively high density of wireless devices, changing logical group area identity and notifying all the wireless devices about the changed logical group area identity might cause an instantaneous comparatively high traffic load on the radio access network nodes serving the cells for which the logical group area identity is changed. In order to reduce these high peak rates the network operators are not forced to announce the new system information update (containing the new logical group area identity) to all wireless devices immediately, but could be configured to spread out the announcing of the new system information update over time (e.g. seconds). This can e.g. be achieved by during a certain period only sending system information change indication to a subset of wireless devices (i.e. only in a subset of paging occasions), before notifying other wireless devices about the changed logical group area identity. Hence, according to an embodiment the change of logical group area is initiated such that the update of the logical group area of the cells 120a that at least partly overlap with the geographical area 110 is spread out in time.

Reference is now made to FIG. 5 illustrating a method for locating wireless devices 130a, 130b as performed by the surveillance center node 300 according to an embodiment.

S202: The surveillance center node 300 obtains a request for locating wireless devices 130a, 130b in a geographical area 110.

The surveillance center node 300 is therefore configured to perform step S204:

S204: The surveillance center node 300 provides an indication to locate the wireless devices 130a, 130b in the geographical area 110 to one or more network operator nodes having cells 120a-c in the geographical area 110, e.g. network operator node 200a.

The network operator node 200a may thereafter report location indicating information of the wireless devices 130a, 130b to the surveillance center node 300, as in step S124. Hence, the surveillance center node 300 is configured to perform step S206:

S206: The surveillance center node 300, in response to having provided the indication in step S204, receives location indicating information of the wireless devices 130a, 130b from the network operator node 200a.

This method enables real-time tracking of wireless devices 130a, 130b in an area of interest.

Embodiments relating to further details of locating wireless devices 130a, 130b as performed by the surveillance center node 300 will now be disclosed.

There could be different ways for the surveillance center node 300 to obtain the request in step S202. For example, the request could be obtained as input from an emergency center and could be caused by an emergency in an incident area corresponding to the geographical area 110.

There could be different ways for the surveillance center node 300 to act upon having received the location indicating information of the wireless devices 130a, 130b from the network operator node 200a in step S206. For example, the surveillance center node 300 could be configured to report the location indicating information to a further node, such as a node in the emergency center, or otherwise to internally process the location indicating information in the surveillance center node 300.

The surveillance center node 300 could track the wireless devices 130a, 130b as long as it continues to receive the positioning information of the wireless devices 130a, 130b from the network operator node 200a. Once such tracking is not needed any more, for example, in case the wireless devices 130a, 130b have moved outside the geographical area 110 or more importantly when one or more of the wireless devices 130a, 130b for some other reason not need to be tracked any longer, the surveillance center node 300 requests the network operator node 200a to stop locating one or more of the wireless devices 130a, 130b. Hence, according to an embodiment the surveillance center node 300 is configured to perform step S208:

S208: The surveillance center node 300 provides an indication to the network operator node 200a to stop locating one or more of the wireless devices 130a, 130b.

In some aspects the indication pertains only to stop locating the wireless devices 130a, 130b outside the geographical area 110, in other aspects the indication pertains only to stop locating the wireless devices 130a, 130b inside the geographical area 110, and yet other aspects the indication pertains only to stop locating the wireless devices 130a, 130b regardless if they are inside or outside the geographical area 110. The stop decision may for example be taken by surveillance personnel based on the type of emergency situation and the identity of the tracked wireless devices. Alternatively, the stop decision is taken automatically, e.g., by a surveillance routine implemented in the surveillance center node 300 itself or in another node.

The surveillance center node 300 could ask for the location for a specific wireless device although this wireless device may, or may not, be outside the geographical area 110 (e.g. a wireless device that is currently in a call with a currently tracked wireless device 130a, 130b).

In some aspects the surveillance center node 300 has knowledge about which network operators that have cells covering a specific geographical region and a geographical radius of interest, and hence at least partly covering the geographical region 110.

Aspects applicable to any of the above disclosed methods for locating wireless devices 130a, 130b will now be presented.

As disclosed above, the surveillance center node 300 is connected to various network operator nodes 200a, 200b, 200c. The surveillance center node 300 is able to receive alarm and geographical location information about an incident. As a soon as the geographical location is known by the surveillance center node 300 (either via an emergency call and remotely enabled positioning software or by other means) the location and a geographical radius of interest defining the geographical area 110 is passed on to the network operator nodes 200a, 200b, 200c. The network operator nodes 200a, 200b, 200c change the logical group area identity (such as the tracking area, location area, or service area) of all the cells that at least partly overlap with the geographical area 110. The new logical group area identities of the cells will force all wireless devices 130a, 130b in the affected cells to perform a tracking area update procedure.

When this occurs, the network operator nodes 200a, 200b, 200c will know which wireless devices 130a, 130b are in the affected geographical area 110 and enable all those wireless devices 130a, 130b to use a positioning mechanism to report the position of the wireless devices 130a, 130b until the positioning mechanisms have been disabled. The position of the wireless devices 130a, 130b together with subscriber data and other type of information e.g. mode (idle mode or connected mode) of the wireless devices 130a, will then be reported to the surveillance center node 300 as long as the surveillance center node 300 is interested in the information.

Figure 6:
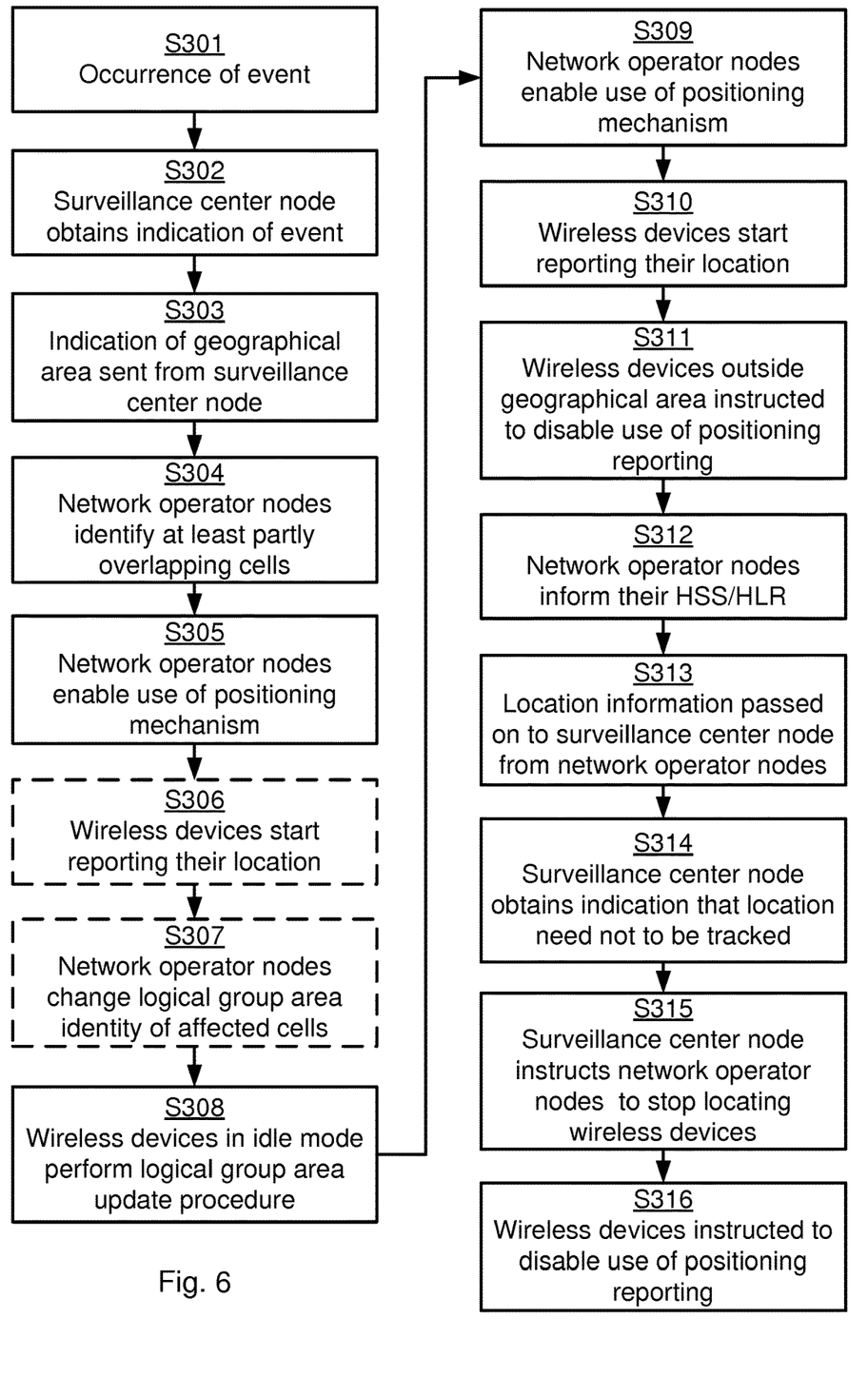

One particular embodiment for locating wireless devices 130a, 130b based on at least some of the above disclosed embodiments will now be disclosed in detail with reference to the flowchart of FIG. 6.

Step S301: An event occurs at a geographical location. Examples of events are emergencies, natural disasters, acts of crimes, and acts of terrorism. The event requires wireless devices to be located.

Step S302: The surveillance center node 300 obtains an indication of the event and determines the geographical location and a geographical radius of interest of the event, the geographical radius of interest giving rise to a geographical area 110.

S303: An indication of the geographical area 110, and optionally information of the geographic location itself, is sent from the surveillance center node 300 to network operator nodes 200a, 200b, 200c, good of all network operators (see also alternative below).

S304: The network operator nodes 200a, 200b, 200c, good of each network operators identify those of its cells 120a, 120b, 120c, 120d that at least partly overlap with the geographical area 110 and denotes these cells as affected cells.

Alternatively, as described above, the identification is made by the surveillance center node 300 whereby the surveillance center node 300 in step S303 instead of sending an indication of the geographical area 110 sends an indication of the affected cells.

In the illustrative example of FIG. 1 the network operator of network operator node 200d does not have any cells 120d that at least partly overlap with the geographical area 110 and hence continues with normal operation.

S305 (Optional): The network operator nodes 200a, 200b, 200c of each network operator with cells 120a, 120b, 120c at least partly overlap with the geographical area 110 enable the use of a positioning mechanism of all wireless devices currently in connected mode within the affected cells.

S306 (Optional): Wireless devices in connected mode and located in the affected cells start reporting their location.

S307: The network operator nodes 200a, 200b, 200c of each network operators with cells at least partly overlap with the geographical area 110 change the logical group area identity of its affected cells.

S308: All wireless devices 130a, 130b in idle mode will, due to the changed logical group area identity, perform a logical group area update procedure (such as a tracking area update (TAU) procedure) to announce their presence in the new logical group area.

S309: The network operator nodes 200a, 200b, 200c of each network operators with cells at least partly overlap with the geographical area 110 enable the use of a positioning mechanism of all wireless devices 130a, 130b in the new logical group area.

S310: All wireless devices 130a, 130b (including those previously in Idle mode) start reporting their location with high granularity.

S311: Wireless devices 130b, 130c outside the geographical radius of interest are preferably instructed to disable use of their location reporting mechanisms. This means that only wireless devices 130a that reported a position within the geographical area 110 will continue to report their positions. This further means that wireless devices 130a currently inside the geographical area 110 can be continuously tracked even if moving out from the geographical area 110. If all wireless devices 130a of interest have moved out of the geographical area 110, any wireless devices remaining in the geographical area 110 could be instructed to disable use of their location reporting mechanisms.

S312: The network operator nodes 200a, 200b, 200c of each network operator with cells at least partly overlapping with the geographical area 110 inform its HSS and/or Home Location Register (HLR) in the HSS, or the like, that the location of the wireless devices 130a, 130b is tracked and each HSS and/or HLR keeps track (by means of subscriber information or lack thereof)) of which wireless devices 130a, 130b that are tracked.

If a wireless device 130a, 130b starts roaming, the visitor HSS and/or Visitor Location Register (VLR) get this information from the Home HSS and/or HLR. If the tracked wireless device 130a, 130b is already in a roaming state, its home HSS and/or HLR is notified that the location of the wireless devices 130a, 130b is tracked. That is, when a handover is performed, tracking of the location of the wireless device 130a, 130b could continue and the network operator to which the wireless device 130a, 130b was handed over to should then continue reporting the location to the surveillance center node 300.

S313: The location information of the wireless device 130a, 130b is passed on to the surveillance center node 300 from the network operator nodes 200a, 200b, 200c of each network operators with cells at least partly overlap with the geographical area 110. The surveillance center node 300 may then determine whether to keep tracking the location of the wireless devices 130a, 130b.

S314: The surveillance center node 300 obtains an indication that the location of the wireless devices 130a, 130b need not to be tracked (for example by the event being handled or having ended).

S315: The surveillance center node 300 instructs the network operator nodes 200a, 200b, 200c to stop locating the wireless devices 130a, 130b.

S316: Wireless devices 130a, 130b are instructed to disable use of their location reporting mechanisms.

Figure 7:
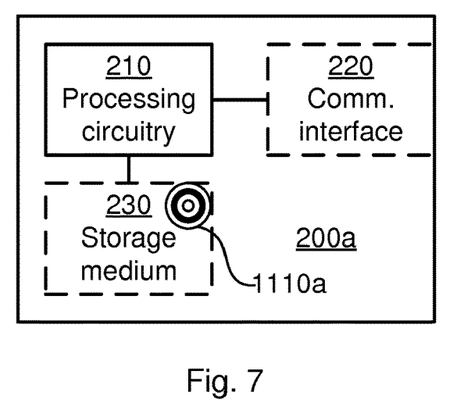
FIG. 7 is a schematic diagram showing functional units of a network operator node according to an embodiment.

FIG. 7 schematically illustrates, in terms of a number of functional units, the components of a network operator node 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network operator node 200a to perform a set of operations, or steps, S102-S128, as disclosed above. For example, the storage medium 230 may store the set of operations, and the processing circuitry 210 may be configured to retrieve the set of operations from the storage medium 230 to cause the network operator node 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network operator node 200a may further comprise a communications interface 220 for communications with other entities, nodes, and devices in, or operatively connected to, the communications network 100. As such the communications interface 220 may comprise one or more transmitters and receivers, comprising analogue and digital components.

The processing circuitry 210 controls the general operation of the network operator node 200a e.g. by sending data and control signals to the communications interface 220 and the storage medium 230, by receiving data and reports from the communications interface 220, and by retrieving data and instructions from the storage medium 230. Other components, as well as the related functionality, of the network operator node 200a are omitted in order not to obscure the concepts presented herein.

Figure 8:
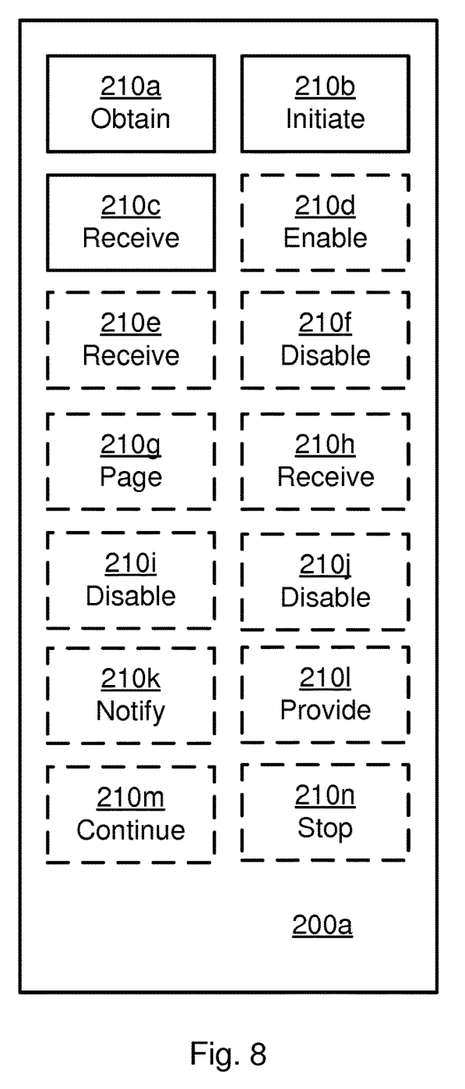
FIG. 8 is a schematic diagram showing functional modules of a network operator node according to an embodiment.

FIG. 8 schematically illustrates, in terms of a number of functional modules, the components of a network operator node 200a according to an embodiment. The network operator node 200a of FIG. 8 comprises a number of functional modules; an obtain module 210a configured to perform step S102, an initiate module 210b configured to perform step S104, and a receive module 210c configured to perform step S106. The network operator node 200a of FIG. 8 may further comprise a number of optional functional modules, such as any of an enable module 210d configured to perform step S108, a receive module 210e configured to perform step S110, a disable module 210f configured to perform step S112, a page module 210g configured to perform step S114, a receive module 210h configured to perform step S116, a disable module 210i configured to perform step S118, a disable module 210j configured to perform step S120, a notify module 210k configured to perform step S122, a provide module 210l configured to perform step S124, a continue module 210m configured to perform step S126, and a stop module 210n configured to perform step S128.

In general terms, each functional module 210a-210n may be implemented in hardware or in software. Preferably, one or more or all functional modules 210a-210n may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210n and to execute these instructions, thereby performing any steps of the network operator node 200a as disclosed herein.

Figure 9:
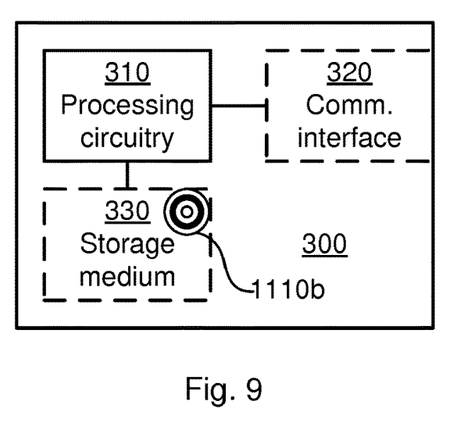
FIG. 9 is a schematic diagram showing functional units of a surveillance center node according to an embodiment.

FIG. 9 schematically illustrates, in terms of a number of functional units, the components of a surveillance center node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product mob (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the surveillance center node 300 to perform a set of operations, or steps, S202-S208, as disclosed above. For example, the storage medium 330 may store the set of operations, and the processing circuitry 310 may be configured to retrieve the set of operations from the storage medium 330 to cause the surveillance center node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The surveillance center node 300 may further comprise a communications interface 320 for communications with other entities, nodes, and devices in, or operatively connected to, the communications network 100. As such the communications interface 320 may comprise one or more transmitters and receivers, comprising analogue and digital components.

The processing circuitry 310 controls the general operation of the surveillance center node 300 e.g. by sending data and control signals to the communications interface 320 and the storage medium 330, by receiving data and reports from the communications interface 320, and by retrieving data and instructions from the storage medium 330. Other components, as well as the related functionality, of the surveillance center node 300 are omitted in order not to obscure the concepts presented herein.

Figure 10:
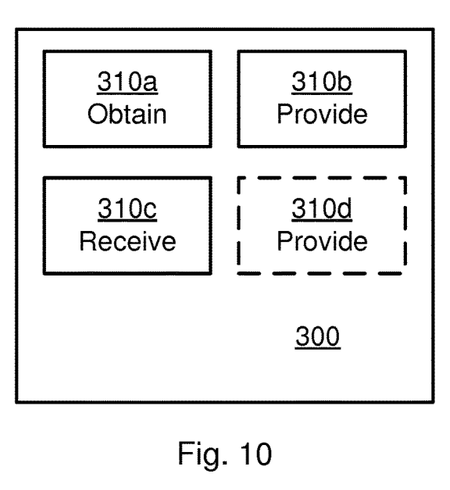
FIG. 10 is a schematic diagram showing functional modules of a surveillance center node according to an embodiment.

FIG. 10 schematically illustrates, in terms of a number of functional modules, the components of a surveillance center node 300 according to an embodiment. The surveillance center node 300 of FIG. 10 comprises a number of functional modules; an obtain module 310a configured to perform step S202, a provide module 310b configured to perform step S204, and a receive module 310c configured to perform step S206. The surveillance center node 300 of FIG. 10 may further comprise a number of optional functional modules, such as a provide module 310d configured to perform step S208. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the surveillance center node 300 as disclosed herein.

The network operator node 200a and/or the surveillance center node 300 may be provided as respective standalone devices or as respective parts of at least one further device. Alternatively, functionality of the network operator node 200a and/or surveillance center node 300 may be distributed between at least two respective devices, or nodes. These at least two nodes, or devices, may either be part of the same network part or may be spread between at least two such network parts.

Thus, a first portion of the instructions performed by the network operator node 200a and/or surveillance center node 300 may be executed in a first device, and a second portion of the of the instructions performed by the network operator node 200a and/or surveillance center node 300 may be executed in a second device; the herein disclosed embodiments are not limited to any particular number of devices on which the instructions performed by the network operator node 200a and/or the surveillance center node 300 may be executed. Hence, the methods according to the herein disclosed embodiments are suitable to be performed by a network operator node 200a and/or a surveillance center node 300 residing in a cloud computational environment. Therefore, although a single processing circuitry 210, 310 is illustrated in FIG. 8 and to the processing circuitry 210, 310 may be distributed among a plurality of devices, or nodes. The same applies to the functional modules 210a-210n, 310a-310d of FIGS. 9 and 11 and the computer programs 1120a, 1120b of FIG. 11 (see below).

Figure 11:
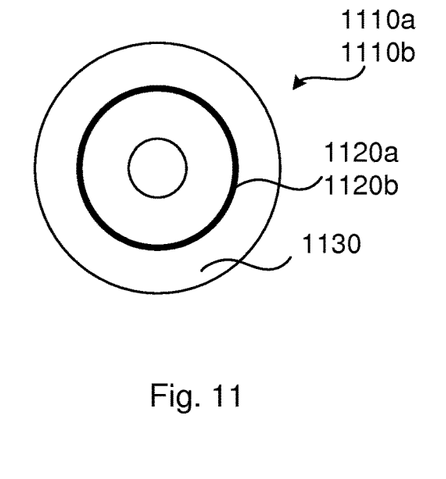
FIG. 11 shows one example of a computer program product comprising computer readable means according to an embodiment.

FIG. 11 shows one example of a computer program product moa, mob comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the network operator node 200a as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the surveillance center node 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product moa, mob could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network operator node of cells for locating wireless devices, the network operator node comprising processing circuitry, the processing circuitry being configured to cause the network operator node to:
obtain an indication to locate the wireless devices in a geographical area from a surveillance center node;
initiate a change of logical group area identity of specific cells, of the cells, that at least partly overlap with the geographical area, thereby initiating location reporting and enabling position determination from the wireless devices located in the geographical area that are in an idle mode; and in response thereto:
receive location indicating information and positioning information of the wireless devices in the geographical area.

2. The network operator node according to claim 1, the processing circuitry being further configured to cause the network operator node to:
enable at least some of the wireless devices located in the geographical area to perform the position determination; and
in response to enabling said at least some of the wireless devices in the geographical area to perform the position determination, receive, from said at least some of the wireless devices, the positioning information resulting from the position determination.

3. The network operator node according to claim 2, the processing circuitry being further configured to cause the network operator node to disable at least some of the wireless devices located in the geographical area from performing the position determination.

4. The network operator node according to claim 1, the processing circuitry being further configured to cause the network operator node to:
page at least some of the wireless devices located in the geographical area; and
receive, from said at least some of the wireless devices, paging responses, the paging responses defining location information of said at least some of the wireless devices.

5. The network operator node according to claim 2, the processing circuitry being further configured to cause the network operator node to disable wireless devices located in cells outside the geographical area from performing the position determination.

6. The network operator node according to claim 2, the processing circuitry being further configured to cause the network operator node to disable wireless devices located outside the geographical area but served by one or more of the specific cells that at least partly overlaps with the geographical area from performing the position determination.

7. The network operator node according to claim 1, the processing circuitry being further configured to cause the network operator node to notify a Home Subscriber Server of the network operator node to keep track of the wireless devices from which the location indicating information and the positioning information is obtained.

8. The network operator node according to claim 1, the processing circuitry being further configured to cause the network operator node to provide the location indicating information of the wireless devices to the surveillance center node.

9. The network operator node according to claim 2, the processing circuitry being further configured to cause the network operator node to:
continue receiving the positioning information from the wireless devices until an indication to stop locating the wireless devices is obtained from the surveillance center node; and
stop receiving the positioning information from the wireless devices when the indication to stop locating the wireless devices is obtained.

10. The network operator node according to claim 1, wherein the indication to locate the wireless devices defines the geographical area or defines the specific cells for which the logical group area identity is to be changed.

11. The network operator node according to claim 1, wherein the location indicating information is a Tracking Area update.

12. The network operator node according to claim 1, wherein a logical group area identified by the logical group area identity is a Tracking Area, a Location Area, or a Service Area.

13. The network operator node according to claim 1, wherein the change of the logical group area identity is initiated such that update of the logical group area identity of the specific cells that at least partly overlap with the geographical area is spread out in time.

14. A method for locating wireless devices, the method being performed by a network operator node of cells, the method comprising:
   obtaining an indication to locate the wireless devices in a geographical area from a surveillance center node;
   initiating a change of logical group area identity of specific cells, of the cells, that at least partly overlap with the geographical area, thereby initiating location reporting and enabling position determination from the wireless devices located in the geographical area that are in an idle mode; and
   in response thereto, receiving location indicating information and position information of the wireless devices in the geographical area.

15. The method according to claim 14, further comprising:
   enabling at least some of the wireless devices located in the geographical area to perform the position determination; and
   in response to said enabling, receiving, from said at least some of the wireless devices, the positioning information resulting from the position determination.

16. The method according to claim 15, further comprising:
   disabling at least some of the wireless devices located in the geographical area from performing the position determination.

* * * * *